US008893496B2

(12) United States Patent
Ramamurthy

(10) Patent No.: US 8,893,496 B2
(45) Date of Patent: Nov. 25, 2014

(54) SEA WATER DESALINATION AND THERMAL ENERGY CONVERSION

(75) Inventor: Valangiman Subramanian Ramamurthy, New Delhi (IN)

(73) Assignee: Empire Technology Development LLC, Wilmington, DE (US)

( * ) Notice: Subject to any disclaimer, the term of this patent is extended or adjusted under 35 U.S.C. 154(b) by 1014 days.

(21) Appl. No.: 12/506,259

(22) Filed: Jul. 21, 2009

(65) Prior Publication Data

US 2010/0050636 A1    Mar. 4, 2010

(30) Foreign Application Priority Data

Aug. 29, 2008    (IN) .......................... 2055/DEL/2008

(51) Int. Cl.
*F03G 7/05*        (2006.01)
*C02F 1/04*        (2006.01)
*C02F 103/08*      (2006.01)
*C02F 1/06*        (2006.01)

(52) U.S. Cl.
CPC .............. *C02F 1/04* (2013.01); *C02F 2103/08* (2013.01); *C02F 1/06* (2013.01); *Y02E 10/34* (2013.01)
USPC ...................................... 60/641.7

(58) Field of Classification Search
USPC .................... 60/641.6, 641.7, 641.9; 203/10; 210/642
See application file for complete search history.

(56) References Cited

U.S. PATENT DOCUMENTS

| 4,189,647 | A | * | 2/1980 | Wittig ............................. 290/42 |
| 4,302,297 | A | * | 11/1981 | Humiston .................. 202/185.1 |
| 4,504,362 | A | * | 3/1985 | Kruse ................................ 203/3 |
| 5,513,494 | A | * | 5/1996 | Flynn et al. .................. 60/641.7 |
| 2007/0289303 | A1 | * | 12/2007 | Prueitt ......................... 60/641.7 |

OTHER PUBLICATIONS

Ocean Thermal Energy Conversion, http://www.eere.energy.gov/basics/renewable_energy/ocean_thermal_energy_conv.html?p (Aug. 21, 2011).

* cited by examiner

*Primary Examiner* — Kenneth Bomberg
*Assistant Examiner* — Jonathan Matthias
(74) *Attorney, Agent, or Firm* — Pepper Hamilton LLP

(57) ABSTRACT

A system for energy conversion includes a first sub-system to be disposed at about a surface of the ocean and a second sub-system to be disposed at an ocean depth. The first sub-system includes an evaporation unit. The system also includes a turbine that is coupled between the first and second sub-systems. The first heat exchange unit is configured to vaporize a working fluid, the vaporized working fluid turns the turbine. The second sub-system is configured to condense the working fluid.

15 Claims, 4 Drawing Sheets

SEA WATER DESALINATION AND THERMAL ENERGY CONVERSION

CROSS-REFERENCES TO RELATED APPLICATIONS

This application claims priority to Indian Patent Application No. 2055/DEL/2008, filed on Aug. 29, 2008 in India (IN), the entire contents of which are herein incorporated by reference.

BACKGROUND

Sea water desalination is emerging as an important source of portable water in satisfying the increasing demand for water globally. Interests in ocean thermal energy conversion (OTEC) as an alternative energy source have been spurred on not only by the skyrocketing energy demand and prices but also by the need to find new renewable sources of clean energy in light of global warming concerns.

FIG. 1 shows a diagram of a heat engine 100. As shown, heat ($Q_H$) from a high temperature (HT) reservoir 110 flows through the engine to a low temperature (LT) reservoir 120. Heat is transmitted in the form of a fluid or vapor through a generator 140 to produce work (W). The theoretical maximum efficiency ($\eta$) of a heat engine is:

$$\eta = 1 - \frac{T_C}{T_H}$$

where $T_C$ is the absolute temperature of the LT reservoir and $T_H$ is the absolute temperature of the HT reservoir. From the efficiency equation, it can be seen that the greater the differential between the temperatures of the reservoirs, the greater the efficiency of the heat engine.

For an OTEC system, it operates on the temperature differential between the ocean's surface and its lower depths. Generally, seawater at the ocean surface is about 28° C. (301 K) while the seawater at the subsurface, typically about 1000 meters (m) or beyond, rarely exceeds 5° C. (278 K). Given these facts, the maximum theoretical efficiency of an OTEC system is about 7.5%. With such a low efficiency, the various components of the system must be designed to operate at extremely high efficiencies to produce a net power gain. However, conventional OTEC systems require seawater to be pumped from the subsurface, typically from 1000 m or greater, to the surface. Since cold water is denser than warm water, pumping of seawater from such depths to the surface requires significant energy, which negatively impacts the already low efficiency or yield of the system. Additionally, the volume of deep seawater needed puts extreme stress on the pipes, creating reliability issues because of the large difference between the latent heat of vaporization and the specific heat and also the small difference in temperature between the vapor and the cooling water.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
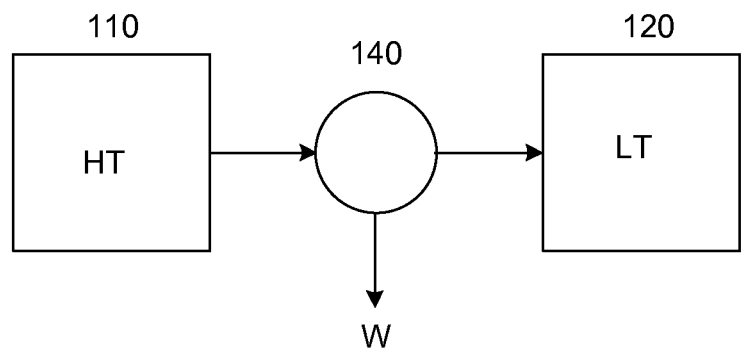
FIG. 1 shows a block diagram of a heat engine.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure. This disclosure is drawn, inter alia, to methods, apparatus, computer programs and systems related to utilizing ocean thermal energy. The system may be used on its own as a standalone system or it may be used in multiplicity as part of a larger system.

Figure 2A:
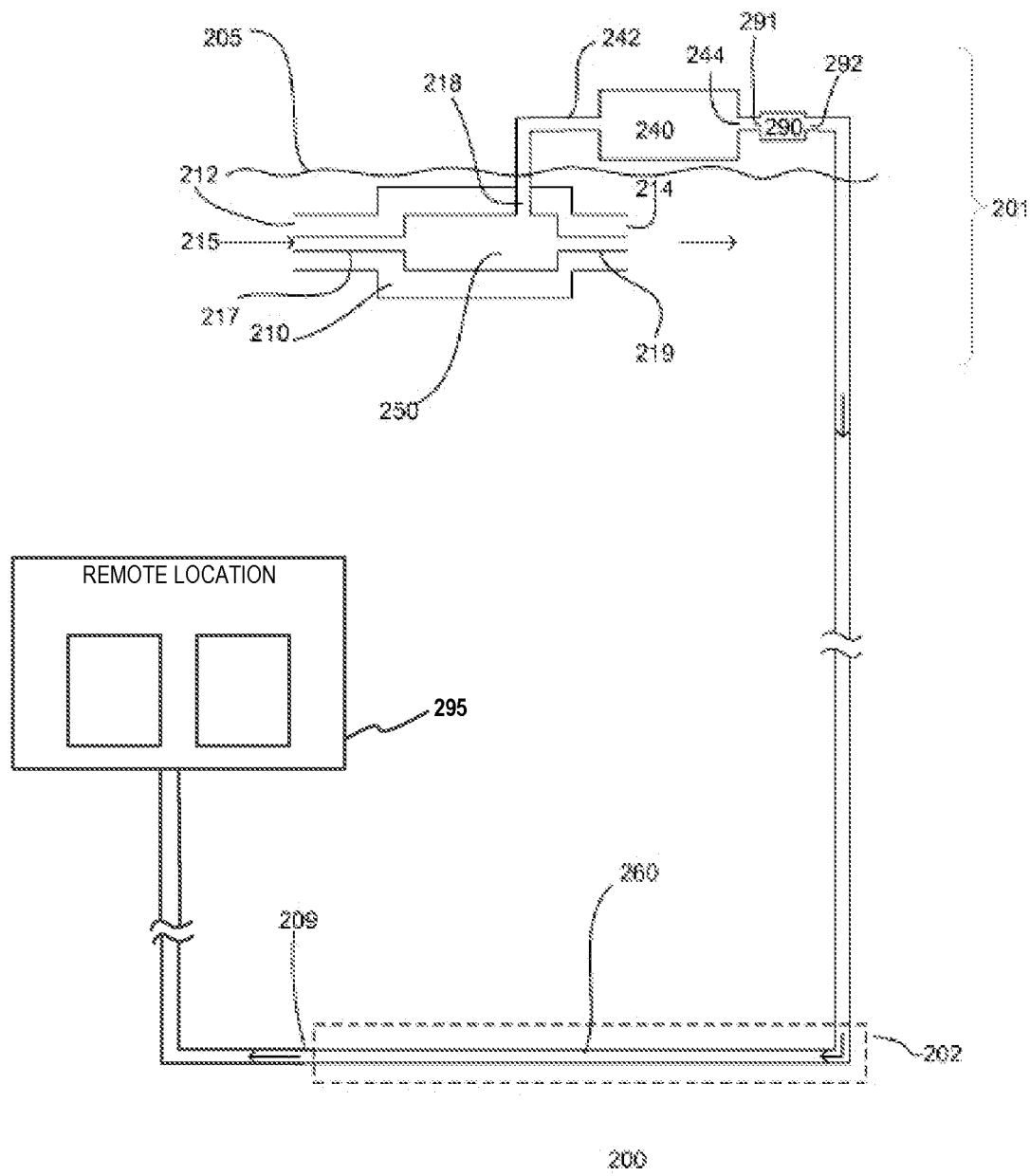
FIGS. 2A and 2B depict schematic views of an OTEC system according to various embodiments.
Figure 2B:
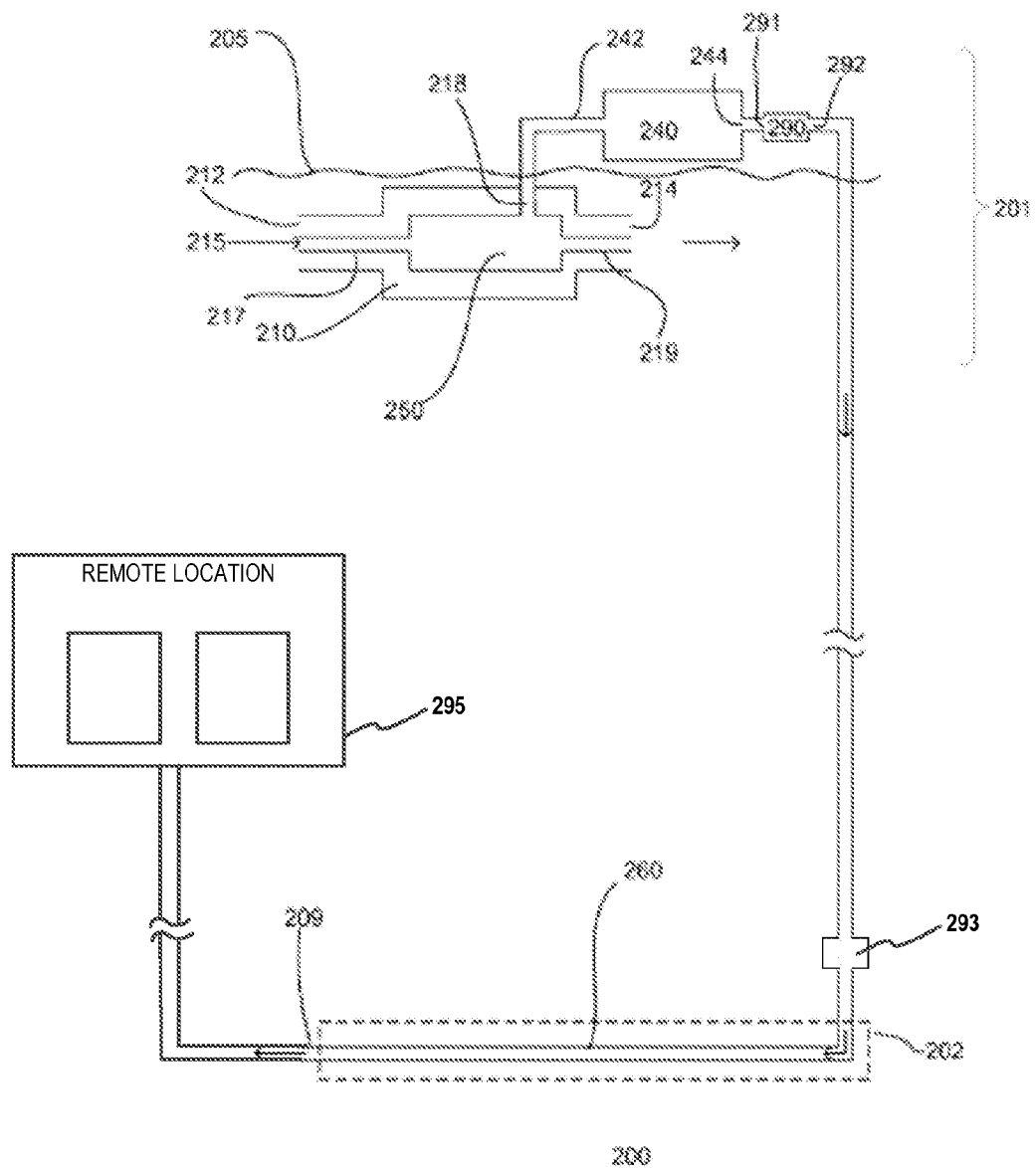

FIGS. 2A and 2B each depict an OTEC system 200 according to various embodiments. As shown, the system comprises an open-cycle system. The system can be deployed using a floating platform (not shown) on a surface 205 of the ocean or sea. The floating platform, for example, can be an offshore barge or a converted ship. Other types of floating platforms, such as a semi-submersible, can also be used in other embodiments. In one embodiment, the system comprises an upper portion 201 and a lower portion 202. The upper portion 201 is located at or near the surface. The upper portion 201, for example, may be located from the surface to about less than 30 m below the surface. As for the lower portion 202, it can be located at about 500-1000 m or greater beneath the surface. In other embodiments, the upper portion 201 and lower portion 202 may each be located at other depths, for example from about 800 m or greater. The lower portion 202, for example, may depend on location and geographical limitations.

In one embodiment, the upper portion comprises an evaporation unit 210. The evaporation unit comprises an evaporator 250. Inlet 212 and outlet 214 are provided for evaporation unit. Warm seawater 215 at or near the surface is pumped into the evaporation unit via the inlet and out through the outlet by a pump (not shown). Various types of pumps can be used to pump the water into the evaporation unit. The evaporator is in thermal communication with the warm seawater.

In one embodiment, the working fluid of the system comprises seawater. For example, as seawater is pumped into the evaporation unit, seawater is also provided to the evaporator. Various types of evaporators can be employed. For example, the evaporator may comprise a flash evaporator. In other embodiments, other types of evaporators or heat exchangers may be used instead. The evaporator can be a single or multistage evaporator. The evaporation unit may depend on, for example, design requirements. For example, the evaporation unit can be selected to the scale or capacity of the system.

In one embodiment, the evaporator comprises an input port 217 and first and second output ports 218-219. The first input port is coupled to a turbine 240. The turbine, in one embodiment, is disposed in the upper portion. For example, the turbine may be located on the surface such as on the floating platform. The second output port is in communication with the surface of the ocean. A pipe 242 is provided to couple the first output port of the evaporator to an intake port of the turbine. The turbine, for example, includes an electrical generator. Turning of the turbine generates electricity. Various types of turbines can be used. For example, the turbine may be a low pressure turbine. In other embodiments, other types of turbines may be used. The turbine may be coupled via a pipe to the lower portion.

In one embodiment as shown in FIG. 2A, a pump 290 is provided. An input port 291 of the pump 290 is coupled to an exhaust port 244 of the turbine 240. The pump 290, for example, is disposed on the upper portion 201 of the system 200, such as on the floating platform. In alternative embodiments, the pump 290 can be disposed at other locations within the system. For example, the pump 290 could be part of the lower portion 202 or located between the upper portion 201 and the lower portion 202, as shown in FIG. 2B.

A pipe couples the pump to the lower portion. The pipe, for example, couples an output port 292 of the pump 290 to an input port of the lower portion 202. In one embodiment, the lower portion 202 comprises a pipe 260. In other embodiments, the lower portion 202 can include other components of the system 200. For example, a lower pump 293 can be provided at the output port of the lower portion.

In operation, seawater is pumped into the evaporator in the evaporation unit. Also, warm seawater is pumped into the evaporation unit. The warm seawater provides heat for the evaporator to vaporize the seawater therein. Unvaporized seawater exits the evaporator through the second output port and into the ocean. Pure water vapor ($H_2O$) is produced from vaporizing the seawater. The water vapor exits the evaporator via the first output port to the turbine. The expanding vapor turns the turbine to generate electricity.

Vapor exiting the turbine 240 through the turbine exhaust port 244 passes to the lower portion 202. As the vapor is cooled by the deep ocean water, it is condensed to produce fresh or desalinated water. In one embodiment, as shown in FIG. 2B, the lower pump 293 can be provided to facilitate transferring of the fresh water to collection tanks 295. In other embodiments, as shown in FIG. 2A, the pump 290 which pumps the vapor down to the lower portion 202 may be sufficient to transfer the fresh water to the collection tanks 295. The collection tanks 295, for example, can be located on shore. In other embodiments, the collection tanks 295 can be provided at other locations. For example, the collection tanks 295 can be located on a ship or on a floating platform. By continuing to pump seawater into the system 200, electricity and fresh water are continuously generated by vaporization and condensation of the seawater.

Avoiding the need to pump seawater from the ocean depths results in significant advantages. For example, less energy is required to pump the same volume of vapor to the ocean depths than seawater to the ocean surface. Additionally, smaller pipes would be required to pump the steam down, translating to significantly less weight being supported by the floating platform. This improves reliability and stability of the system.

Figure 3:
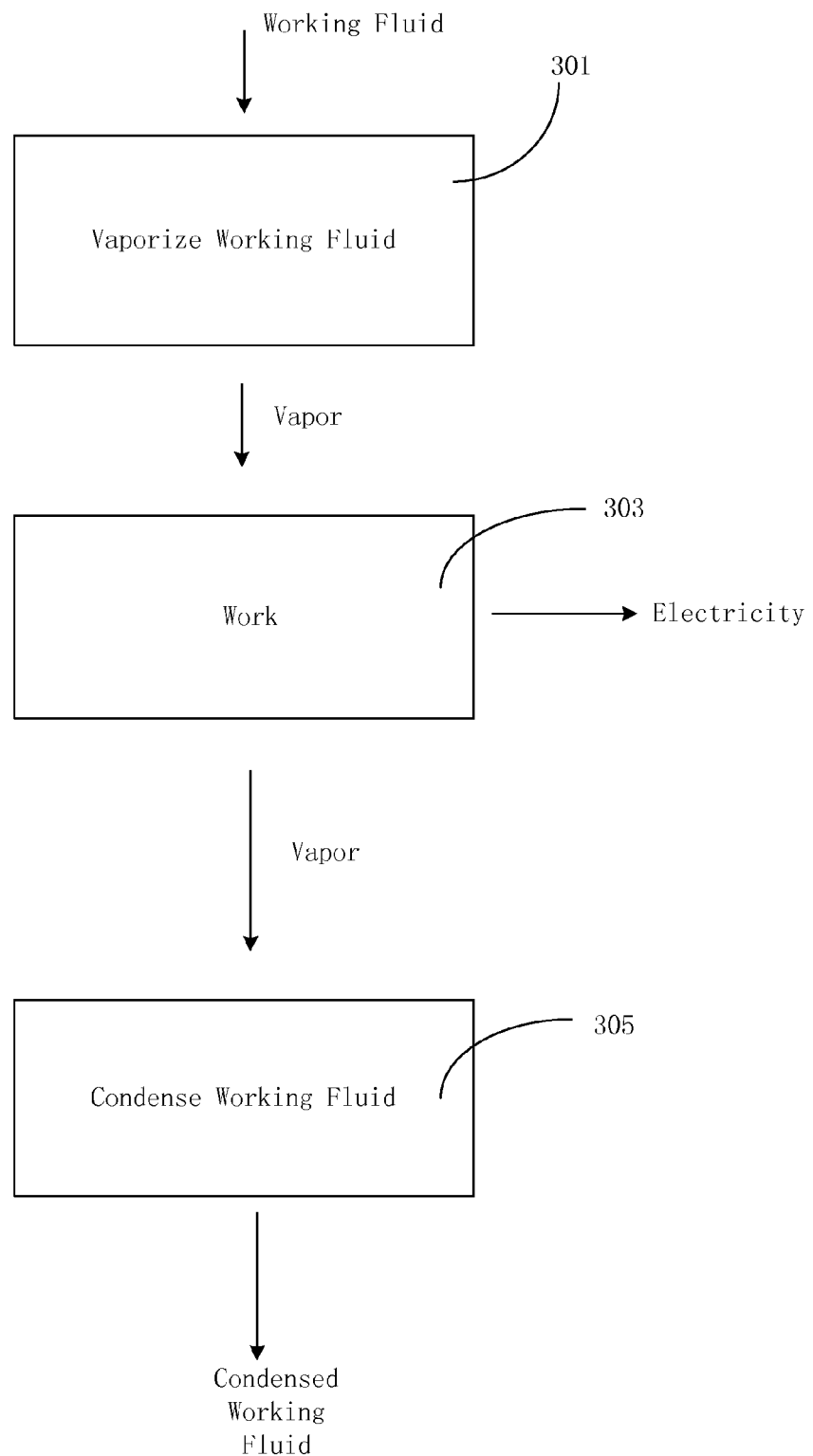
FIG. 3 shows a flow chart of a method for thermal energy conversion from the ocean.

FIG. 3 shows an embodiment of a process for thermal energy conversion from the ocean. As shown, a working fluid is provided to an energy conversion system. In one embodiment, the working fluid comprises seawater. The working fluid is vaporized at step 301. In one embodiment, the working fluid is vaporized at or near the ocean surface, for example, ≤30 m below the ocean surface by an upper portion of the system. To vaporize the working fluid, an evaporator is employed. The working fluid is fed into the evaporator. Warm seawater at or near the surface is pumped into the system and provides heat to the evaporator to evaporate the working fluid. Unvaporized working fluid flows back into the ocean.

The vapor of the working fluid is used to produce work at step 303. For example, the vapor turns a turbine to generate electricity. The turbine, in one embodiment, may be located in the upper portion of the system.

In one embodiment, the vapor that exits from the turbine is condensed at step 305. In one embodiment, the vapor is condensed at the lower portion of the system. A pump can be employed to pump the vapor to the lower portion. Cold seawater at the ocean depths cools the vapor, condensing it back to the working fluid. In one embodiment, the condensed vapor comprises desalinated or fresh water. The desalinated water can be stored in tanks. The tanks, for example, may be located on the floating platform, a ship, or at shore. A pump can be employed to pump the desalinated water to the collection tanks. The process steps of 301 to 305 are repeated in a continuous cycle to produce electricity and desalinated water.

As described, the system may be employed to generate electricity and/or desalinated water using ocean thermal energy. The design of the system can be tailored to meet output requirements. For example, depending on the power and/or fresh water output requirements, the volume of the working fluid, the size of the heat exchangers as well as the pump capacity can be selected appropriately.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
    a first sub-system to be disposed at or near a surface of an ocean, the first sub-system including an evaporation unit;
    a second sub-system to be disposed at an ocean depth of at least 500 meters;
    a turbine;
    a pump disposed between the turbine and the second sub-system; and
    a collection tank coupled to the second sub-system,
    wherein:
        the evaporation unit is configured to vaporize a working fluid comprising seawater by use of heat from fluid located at or near the surface of the ocean that is at a temperature sufficient to vaporize the working fluid,
        the turbine is configured to turn in response to receipt of the vaporized working fluid,
        the pump is configured to pump the vaporized working fluid from the turbine to the second sub-system at the ocean depth,
        the second sub-system is configured to condense the working fluid with seawater located adjacent to the second sub-system at the ocean depth to produce desalinated water, and
        the collection tank is configured to collect the desalinated water from the second sub-system.

2. The system of claim 1 wherein at least a portion of the turbine is incorporated in the first sub-system.

3. The system of claim 1 wherein the evaporation unit comprises an inlet and an outlet to flow seawater through a first heat exchange unit.

4. The system of claim 1 wherein:
    the evaporation unit is configured to vaporize the seawater to produce water vapor; and
    the second sub-system is configured to condense the water vapor to produce the desalinated water.

5. The system of claim 4 wherein the evaporation unit comprises an evaporator in thermal communication with seawater that flows through a first heat exchange unit.

6. The system of claim 4 wherein the second sub-system comprises a pipe configured to condense the vaporized working fluid.

7. The system of claim 5 wherein the evaporator comprises:
    an evaporator input port to receive seawater; and
    first and second evaporator output ports, the first evaporator output port is coupled to the turbine and the second evaporator output port is in communication with the ocean.

8. The system of claim 6 wherein water vapor passes to the turbine through the first evaporator output port and unvaporized seawater returns to the ocean through the second evaporator output port.

9. The system of claim 1 wherein the evaporation unit comprises an evaporator in thermal communication with seawater that flows through the evaporation unit.

10. The system of claim 1 wherein at least a portion of the pump is incorporated in the second sub-system.

11. The system of claim 1 wherein at least a portion of the pump is positioned between the first sub-system and the second sub-system.

12. A method to convert energy from an ocean comprising:
    vaporizing a working fluid comprising seawater by a first heat exchange unit of a first sub-system located at or near a surface of the ocean by use of heat from fluid located at or near the surface of the ocean that is at a temperature sufficient to vaporize the working fluid;
    using the vaporized working fluid to produce work;
    directing the vaporized working fluid to a second sub-system located at an ocean depth of at least 500 meters, wherein a second heat exchanger condenses the vaporized working fluid with seawater located adjacent to the second sub-system to produce desalinated water; and
    directing the desalinated water to a collection tank.

13. The method of claim 12 wherein using the vaporized working fluid to produce work comprises using the vaporized working fluid to turn a turbine to generate electricity.

14. A method to desalinate seawater comprising:
    vaporizing seawater to form water vapor with an evaporation unit of a first sub-system located at or near a surface of the ocean by use of heat from fluid located at or near the surface of the ocean that is at a temperature sufficient to vaporize the seawater;
    using the vaporized seawater to produce work;
    directing the vaporized seawater to a second sub-system located at an ocean depth of at least 500 meters, wherein the second sub-system condenses the vaporized seawater with seawater located adjacent to the second subsystem to produce desalinated water; and directing the desalinated water to a collection tank.

15. The method of claim 14 wherein vaporizing seawater with the evaporation unit includes flowing seawater through an inlet and an outlet of the evaporation unit.

* * * * *

UNITED STATES PATENT AND TRADEMARK OFFICE
CERTIFICATE OF CORRECTION

| | | |
|---|---|---|
| PATENT NO. | : 8,893,496 B2 | Page 1 of 1 |
| APPLICATION NO. | : 12/506259 | |
| DATED | : November 25, 2014 | |
| INVENTOR(S) | : Ramamurthy | |

It is certified that error appears in the above-identified patent and that said Letters Patent is hereby corrected as shown below:

In the Specification

In Column 1, Line 5, delete "APPLICATIONS" and insert -- APPLICATION --, therefor.

Signed and Sealed this
Twenty-eighth Day of April, 2015

Michelle K. Lee
*Director of the United States Patent and Trademark Office*